(12) United States Patent
Bernier

(10) Patent No.: US 9,242,659 B2
(45) Date of Patent: Jan. 26, 2016

(54) HIGH-SPEED MAGNETIC TROLLEY

(71) Applicant: Stephane Bernier, Taxco (MX)

(72) Inventor: Stephane Bernier, Taxco (MX)

(*) Notice: Subject to any disclaimer, the term of this patent is extended or adjusted under 35 U.S.C. 154(b) by 177 days.

(21) Appl. No.: 13/915,279

(22) Filed: Jun. 11, 2013

(65) Prior Publication Data

US 2013/0327242 A1 Dec. 12, 2013

Related U.S. Application Data

(60) Provisional application No. 61/658,259, filed on Jun. 11, 2012.

(51) Int. Cl.
*B61H 9/02* (2006.01)
*H02K 49/04* (2006.01)
*B60T 13/74* (2006.01)
*F16D 63/00* (2006.01)
*F16D 121/20* (2012.01)

(52) U.S. Cl.
CPC ............... *B61H 9/02* (2013.01); *B60T 13/748* (2013.01); *F16D 63/002* (2013.01); *F16D 63/008* (2013.01); *H02K 49/046* (2013.01); *F16D 2121/20* (2013.01)

(58) Field of Classification Search
CPC ..... H02K 49/04; H02K 49/046; A63G 21/22; A63G 21/20; B60L 7/28; B61H 9/02; B61B 7/00; B61B 12/02; E01B 25/18; B60T 13/748; F16D 63/002; F16D 63/008; F16D 2121/20
USPC .................................. 104/113, 115; 105/150
See application file for complete search history.

(56) References Cited

U.S. PATENT DOCUMENTS 3,070,035 A * 12/1962 Russo et al. .................. 104/113
2012/0031297 A1 * 2/2012 Luciani ......................... 105/150

* cited by examiner

*Primary Examiner* — Mark Le
(74) *Attorney, Agent, or Firm* — Michael E. Eisenberg

(57) ABSTRACT

A high-speed magnetic trolley that utilizes an eddy current brake that may reduce the speed of a person in a harness traveling on a relatively steep zip line cable, making it possible to reach a landing brake at a reasonable speed and becomes easy to adjust an amount of braking force needed to reach a desired speed by taking off or adding more magnets without throwing one or more aluminum wheels out of balance. The high-speed magnetic trolley produce an eddy current that generates an opposing magnetic field, which then resists rotation of one or more aluminum wheels providing braking force.

14 Claims, 5 Drawing Sheets

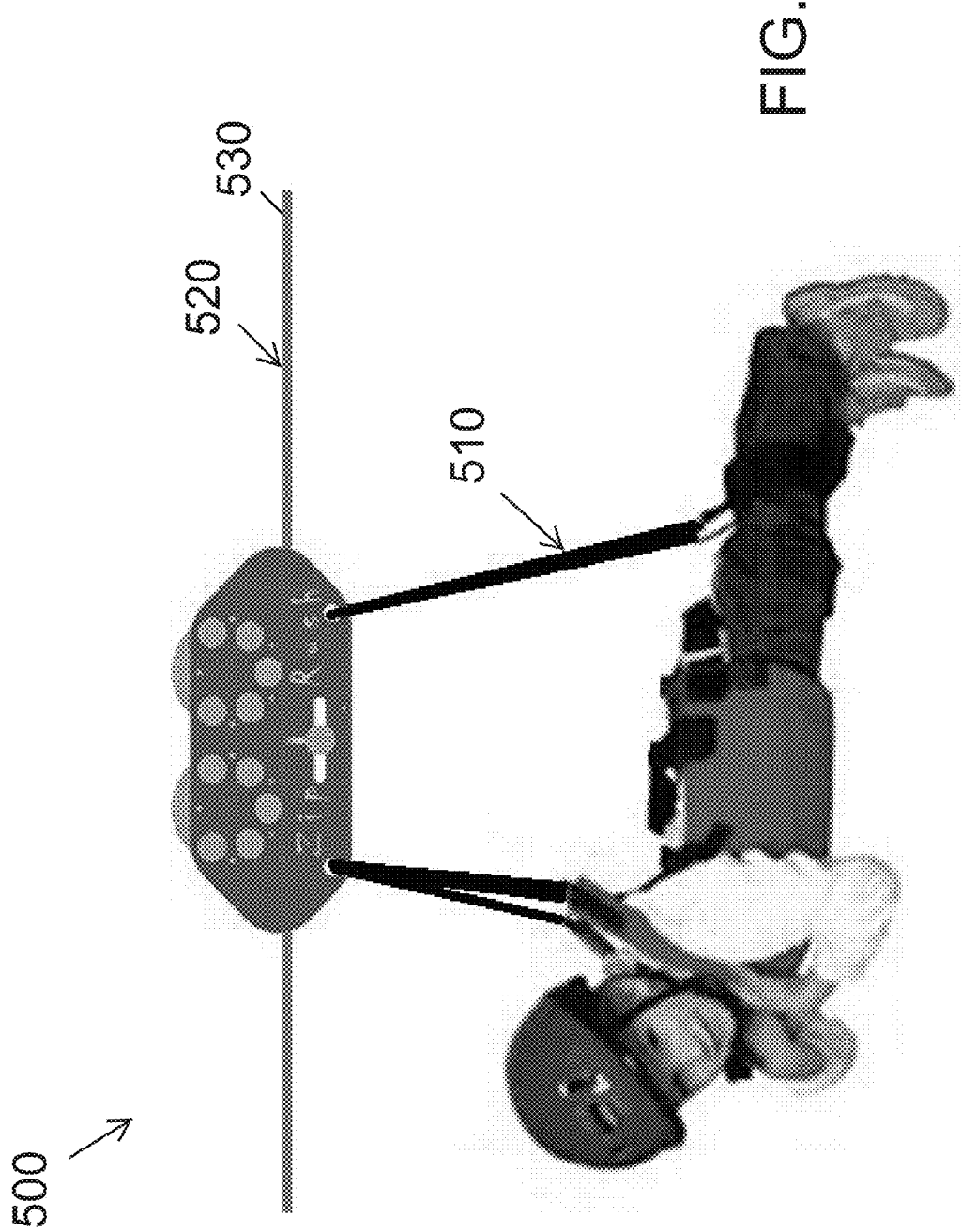

HIGH-SPEED MAGNETIC TROLLEY

This application claims priority to U.S. Provisional Application 61/658,259 filed on Jun. 11, 2012, the entire disclosure of which is incorporated by reference.

BACKGROUND OF THE INVENTION

1. Field of the Invention

The present invention is a magnetic trolley. More specifically, the present invention is a high-speed magnetic trolley.

2. Description of the Related Art

Trolleys may be utilized with a harness to travel along a zip line cable over an area. Many times a person on a zip line cable travelling over an area may go too fast and travel at dangerous speeds. There are trolleys utilizing speed control devices but none that utilizes an eddy current device that also may be used with other types of harnesses used in combination with a zip line cable. The friction trolley device utilizes the rider's weight to counterbalance against a brake pad on a zip line cable as a user travels downward.

BRIEF SUMMARY OF THE INVENTION

The present invention is a magnetic trolley. More specifically, the present invention is a high-speed magnetic trolley.

The high-speed magnetic trolley includes a body having a pair of planar trapezoidal shape parallel plates. The pair of parallel plates includes a plurality of harness coupling apertures to accommodate a chair harness, a climbing harness or a horizontal harness and a removable bar extended through a pair of aligned apertures disposed on the pair of parallel plates. The removable bar is utilized as a harness anchor when the trolley is ridden with the chair harness, wherein the removable bar is fitted with a harness attachment loop to act as an attachment point for the chair harness. The high-speed magnetic trolley also includes a plurality of wheels placed between the pair of parallel plates, the wheels each include a fitted track on a middle circumference portion of the wheels to accommodate the zip line cable. The thickness of one or more spacers define the air gap between the magnets and the aluminum wheel, the air gap between the one or more magnets and the wheels may be adjusted in the range of $1/32$ of an inch to $1/4$ of an inch to provide more or less braking capability and reduce heat buildup.

The high-speed magnetic trolley additionally includes a plurality of body bolts extended through a first set of corresponding apertures, the first set of corresponding apertures are disposed on the pair of parallel plates and the body bolts to couple the one or more spacers in place. A plurality of axles is extended through a second set of apertures disposed on the pair of parallel plates and a centered aperture disposed on each of the wheels. The axles are coupled to the wheels in place while allowing the wheels to rotate and a plurality of magnet holder plates are coupled to an exterior facing of the pair of parallel plates on an opposite side of the pair of parallel plates adjacent to the wheels. The magnet holder plates are coupled with a plurality of fasteners and the magnet holder plates are generally planar shaped and include apertures to accommodate where the magnets goes through. Only the magnetic holder plates keep the magnets in place. The one or more magnets placed inside the high-speed magnetic trolley are in the range of 1 to 20 in order to adjust an amount of braking power and the one or more magnets are coupled in place magnetically by the magnet holder plates.

It is an object of the present invention to provide a high-speed magnetic trolley that utilizes an eddy current brake that may reduce the speed of a person in a harness traveling on a relatively steep zip line cable, making it possible to reach a landing brake at a reasonable speed.

It is an object of the present invention to provide a high-speed magnetic trolley that becomes relatively easy to adjust the amount of braking force needed to reach a desired speed by taking off or adding more magnets without throwing one or more aluminum wheels out of balance.

It is an object of the present invention to provide a high-speed magnetic trolley that generates an opposing magnetic field, which then resists rotation of one or more aluminum wheels providing braking force.

BRIEF DESCRIPTION OF THE DRAWINGS

The present invention will be described by way of exemplary embodiments, but not limitations, illustrated in the accompanying drawings in which like references denote similar elements, and in which:

FIG. 5 illustrates a side perspective view of a horizontal chair harness and a high-speed magnetic trolley, in accordance with one embodiment of the present invention.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention however the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
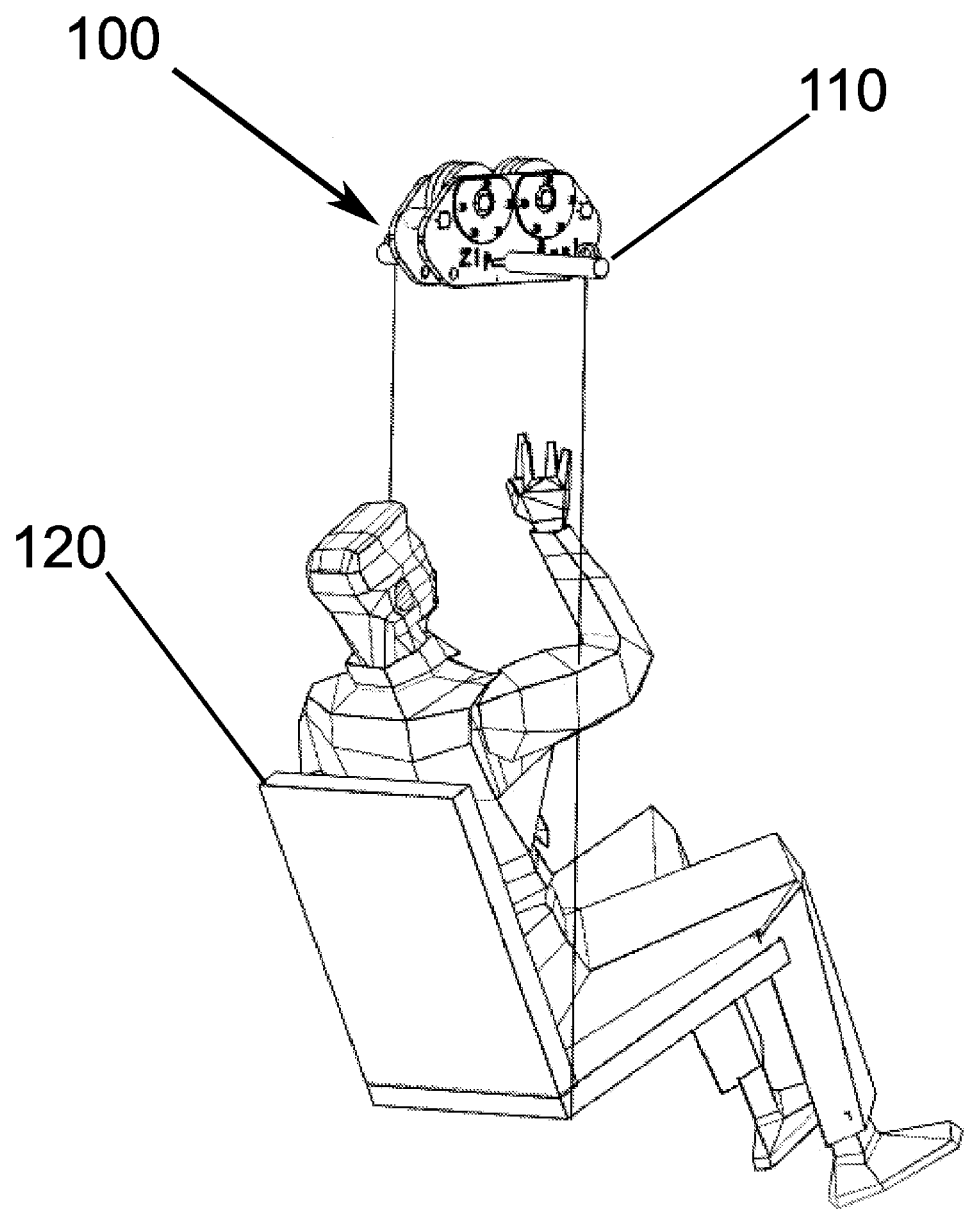
FIG. 1 illustrates a side environmental perspective view of a high-speed magnetic trolley, in accordance with one embodiment of the present invention.

FIG. 1 illustrates a side environmental perspective view of a high-speed magnetic trolley 100, in accordance with one embodiment of the present invention.

The high-speed magnetic trolley 100 includes a removable bar 110. The removable bar 110 may be utilized as a harness anchor that may be ridden with a chair harness 120 commonly utilized with parasailing or other suitable activity. The high-speed magnetic trolley 100 may be utilized with a horizontal harness (FIG. 5, 510) for relatively greater speed than the chair harness 120 or any other suitable type of harness.

Figure 2:
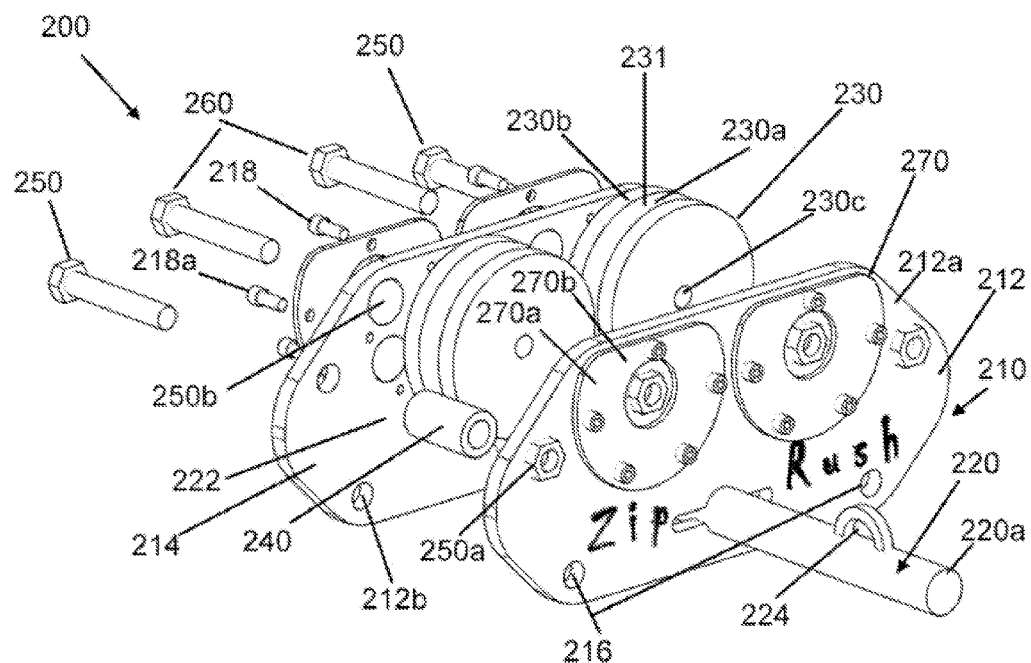
FIG. 2 illustrates an exploded perspective side view of a high-speed magnetic trolley, in accordance with one embodiment of the present invention.

FIG. 2 illustrates an exploded perspective side view of a high-speed magnetic trolley 200, in accordance with one embodiment of the present invention.

Figure 3:
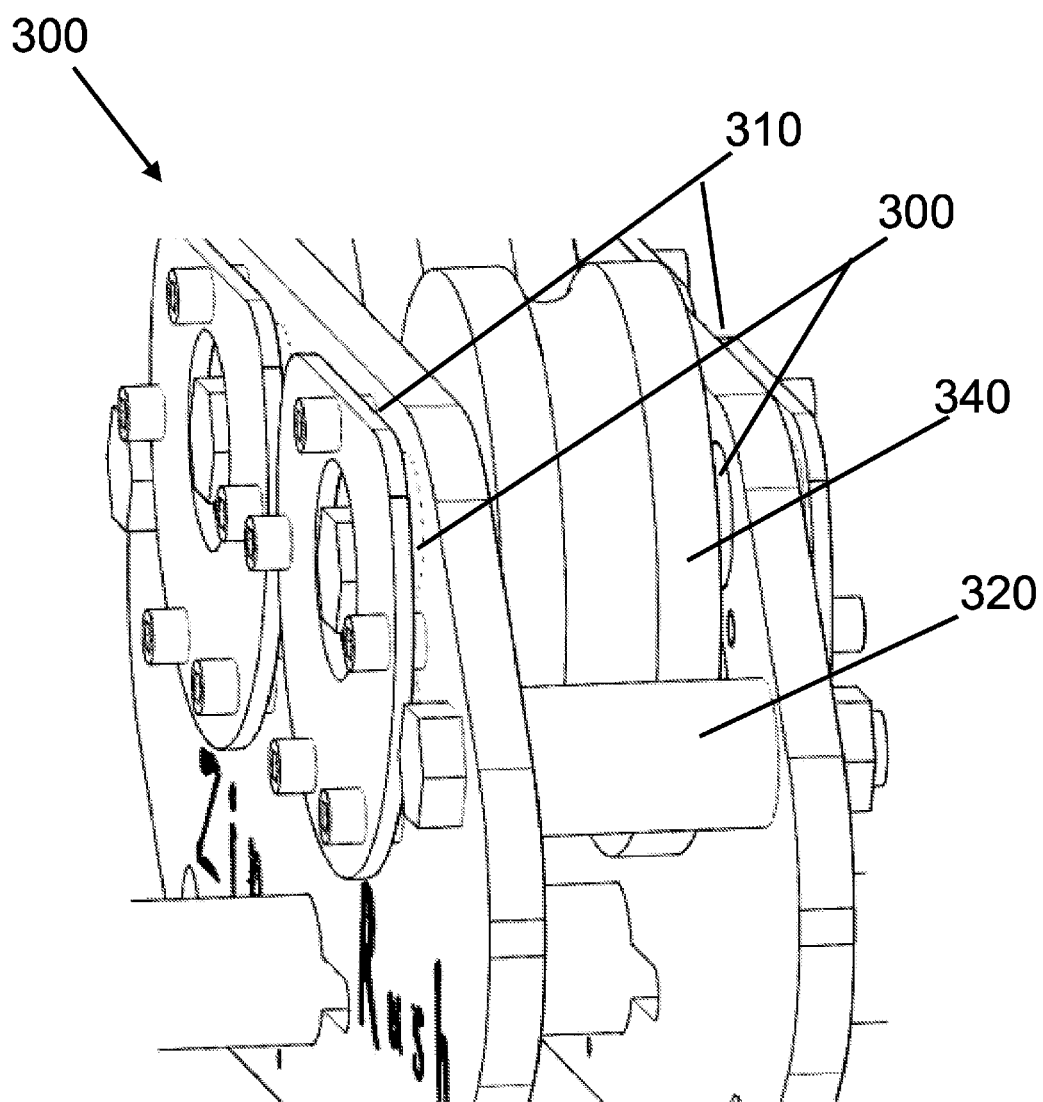
FIG. 3 illustrates a front perspective view of a plurality of magnets and a plurality of magnetic plates, in accordance with one embodiment of the present invention.

The high-speed magnetic trolley 200 may include a body 210, a removable bar 220, a plurality of wheels 230, one or more spacers 240, a plurality of body bolts 250, a plurality of axles 260 and a plurality of magnet holder plates 270. The body 210 may have a pair of parallel plates 212 that may have a planar trapezoidal shape 214 or other suitable shape such as a rectangle. The pair of parallel plates 212 may also include a plurality of harness coupling apertures 216 to accommodate coupling a chair harness (FIG. 1, 120), a horizontal harness (FIG. 5, 510) or any other suitable type of harness. The pair of parallel plates 212 may be made of aluminum or other suitable lightweight material that may allow an eddy current. The removable bar 220 may be extended through a pair of aligned apertures 222 disposed on the pair of parallel plates 212. The removable bar 220 may include a harness attachment loop 224 disposed on each end 220a of the removable bar 220 to accommodate coupling the chair harness (FIG. 1, 120) to the removable bar 220. The removable bar 220 may also be removed to place the high-speed magnetic trolley 200 on a zip line cable (FIG. 5, 520) that may be a steel cable (FIG. 5, 530) or a rope or a synthetic cable that is also a suitable zip line cable. The removable bar 220 may also be made of stainless steel or other suitable material. The wheels 230 may be two wheels 230 or any suitable number of wheels to operate the high-speed magnetic trolley 200. The wheels 230 may be placed between the pair of parallel plates 212 and may include a fitted track 230a on a middle circumference portion 230b of the wheels 230 that accommodates the zip line cable (FIG. 5, 520) that rotates while in contact with the zip line cable (FIG. 5, 520) that may be a rope or a synthetic cable that is also a suitable zip line cable. The wheels 230 may also have a rubber coating 231 on the middle circumference portion 230b. The wheels 230 may also be made of aluminum, polyurethane or other suitable material that may be suitable for braking in accordance with the eddy current principle. The one or more spacers 240 define an open area between the pair of parallel plates 212 where the wheels 230 may be placed. The one or more spacers 240 may be made of aluminum or other suitable lightweight material that allows an eddy current. The body bolts 250 may extend through a first set of corresponding apertures 250a disposed on the pair of parallel plates 212 to couple the one or more spacers 240 in place. The body bolts 250 may be made of stainless steel or other suitable material. The axles 260 may extend through a second set of apertures 250b disposed on the pair of parallel plates 212 and a centered aperture 230c disposed on each of the wheels 230 to couple the wheels 230 in place while allowing the wheels 230 to rotate. The axles 260 may be made of stainless steel or other suitable material. The magnet holder plates 270 may be coupled to an exterior facing 212a of the pair of parallel plates 212 on an opposite side 212b of the pair of parallel plates 212 adjacent to the wheels 230 with a plurality of fasteners 218 such as a plurality of bolts 218a or other suitable fastener. The magnet holder plates 270 may be generally planar shaped 270a and may include an aperture 270b to accommodate one or more magnets (FIG. 3, 300). The magnet holder plates 270 may be made of steel or other suitable material.

The high-speed magnetic trolley may operate as an integrated adjustable magnetic brake. By incorporating a magnet inside an aperture of a body of the high-speed magnetic trolley, the high-speed magnetic trolley may be slowed down to a more manageable speed on relatively steep slopes. The high-speed magnetic trolley may operate according to an eddy current principle that tends to slow down movement between aluminum and one or more magnets. The more speed or movement between the aluminum and the one or more magnets, the more current may be created, therefore increasing the effect of slowing down the wheels of the high-speed magnetic trolley. The body, wheels and all spacers of the high-speed magnetic trolley may be made of aluminum for relatively lighter weight although the purpose of the wheels being made of aluminum may be for braking. The magnetic holder plate may be made of steel in order to hold the magnets in place. All bolts and axles may be made of stainless steel for reliability, durability and esthetics. To place the high-speed magnetic trolley on a zip line cable, a user must remove a removable bar through an aperture and place the high-speed magnetic trolley on the zip line cable then thread the removable bar back inside the high-speed magnetic trolley through the aperture.

FIG. 3 illustrates a front perspective view of one or more magnets 300 and a plurality of magnetic plates 310, in accordance with one embodiment of the present invention.

The high-speed magnetic trolley 200 includes the one or more magnets 300, the magnetic plates 310, one or more spacers 320, a pair of parallel plates 330 and a plurality of wheels 340.

The one or more magnets 300 may be coupled in place magnetically by the magnet holder plates 310. The one or more spacers 320 may be positioned between the pair of parallel plates 330 that may define an open area between the pair of parallel plates 330 where a plurality of wheels 340 may be placed. The open area between the one or more magnets 300 and the wheels 340 may be adjusted in the approximate range of $1/32$ of an inch to $1/4$ of an inch to provide more or less braking capability. The number of the one or more magnets 300 that may be placed inside the high-speed magnetic trolley 200 may be in the approximate range of 1 to 20 in order to adjust the amount of braking power needed for the application. The greater the number of the one or more magnets 300 that may be placed inside the high-speed magnetic trolley 200, the greater the amount of braking power needed for the application.

Figure 4:
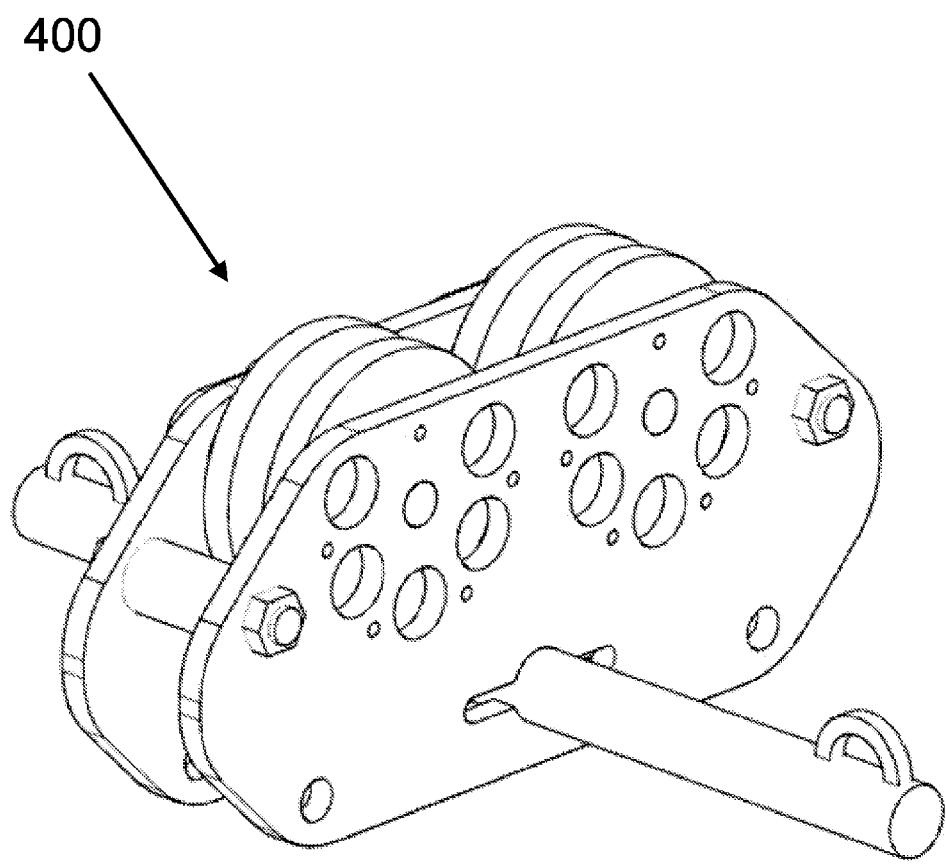
FIG. 4 illustrates a side perspective view of a high-speed magnetic trolley, in accordance with one embodiment of the present invention.

FIG. 4 illustrates a side perspective view of a high-speed magnetic trolley 400, in accordance with one embodiment of the present invention.

The high-speed magnetic trolley 400 may be without one or more magnets 410 and a plurality of magnetic plates 420. The magnetic plates 420 may be removed with the one or more magnets 410 to allow the high-speed magnetic trolley 400 to be utilized at full speed without braking. The high-speed magnetic trolley 400 may be utilized with any suitable number and strength of magnets to reduce the speed of the high-speed magnetic trolley 400.

FIG. 5 illustrates a side perspective view of a horizontal harness 510 and a high-speed magnetic trolley 500, in accordance with one embodiment of the present invention.

The high-speed magnetic trolley 500 may be utilized with a horizontal harness 510 in contrast to a chair harness (FIG. 1, 120). The high-speed magnetic trolley 500 may run along a zip line cable 520 that may be a rope or a synthetic cable that is also a suitable zip line cable.

Use of the high-speed magnetic trolley may be limited to zip line cables with a steep slope. It is hard to define what is considered a steep slope as it depends on the length of the zip line cable. For example, if a 200 meter zip line cable has 40 meters of slope (at an approximate 18 degree angle or 20 percent decline), the speed at landing will probably be too great to land safely. With the utilization of the zip line magnetic brake trolley, it would be possible to reduce the speed considerably to a more manageable landing speed.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A high-speed magnetic trolley, comprising:
   a pair of aligned apertures disposed on a pair of parallel plates;
   a plurality of harness coupling apertures;
   a body having the pair of parallel plates, the pair of parallel plates includes the plurality of harness coupling apertures to accommodate coupling a harness;
   a removable bar extended through the pair of aligned apertures disposed on the pair of parallel plates, the removable bar utilized as a harness anchor that is ridden with a chair harness;
   a plurality of wheels placed between the pair of parallel plates, each wheel include a fitted track on a middle circumference portion of each wheel that accommodates a zip line cable, the wheels rotate while in contact with the zip line cable;
   one or more spacers that define an open area between the pair of parallel plates where the wheels are placed; a plurality of body bolts extended through a first set of corresponding apertures, the first set of corresponding apertures disposed on the pair of parallel plates and the body bolts to couple the one or more spacers in place;
   a plurality of axles extended through a second set of apertures disposed on the pair of parallel plates and a centered aperture disposed on each of the wheels, the axles to couple the wheels in place while allowing the wheels to rotate;
   a plurality of magnet holder plates coupled to an exterior facing of the pair of parallel plates on an opposite side of the pair of parallel plates adjacent to the wheels, the magnet holder plates coupled with a plurality of fasteners;
   wherein the magnet holder plates are generally planar shaped and include an aperture to accommodate one or more magnets; and
   wherein the one or more magnets are coupled in place magnetically by the magnet holder plates.

2. A high-speed magnetic trolley, comprising:
   a pair of aligned apertures disposed on a pair of parallel plates;
   a plurality of harness coupling apertures;
   a body having the pair of parallel plates, the pair of parallel plates includes the plurality of harness coupling apertures to accommodate coupling a harness;
   a removable bar extended through a pair of aligned apertures disposed on the pair of parallel plates, the removable bar utilized as a harness anchor that is ridden with a chair harness;
   a plurality of wheels placed between the pair of parallel plates, each wheel includes a fitted track on a middle circumference portion of the wheel that accommodates a zip line cable, each wheel has a rubber coating on the middle circumference portion, the wheels rotate while in contact with the zip line cable;
   one or more spacers that define an open area between the pair of parallel plates where the wheels are placed, the open area between the one or more magnets and the wheels comprises a distance in the range of 1/32 of an inch to 1/4 of an inch to provide more or less braking capability;
   a plurality of body bolts extended through a first set of corresponding apertures, the first set of corresponding apertures disposed on the pair of parallel plates and the body bolts to couple the one or more spacers in place;
   a plurality of axles extended through a second set of apertures disposed on the pair of parallel plates and a centered aperture disposed on each of the wheels, the axles to couple the wheels in place while allowing the wheels to rotate; and a plurality of magnet holder plates coupled to an exterior facing of the pair of parallel plates on an opposite side of the pair of parallel plates adjacent to the wheels, the magnet holder plates coupled with a plurality of fasteners and the magnet holder plates are generally planar shaped and include an aperture to accommodate one or more magnets.

3. The high-speed magnetic trolley according to claim 2, wherein the removable bar includes a harness attachment loop disposed on each end of the removable bar to accommodate coupling the chair harness to the removable bar.

4. The high-speed magnetic trolley according to claim 2, wherein the number of magnets placed inside the high-speed magnetic trolley is in the range of 1 to 20 in order to adjust an amount of braking power.

5. The high-speed magnetic trolley according to claim 2, wherein the one or more magnets are coupled in place magnetically by the magnet holder plates.

6. The high-speed magnetic trolley according to claim 2, wherein the harness is a chair harness.

7. A high-speed magnetic trolley, comprising:
   a body having a pair of planar trapezoidal shape parallel plates, the pair of parallel plates includes a plurality of harness coupling apertures to accommodate coupling a chair harness;
   a removable bar extended through a pair of aligned apertures disposed on the pair of parallel plates, the removable bar utilized as a harness anchor that is ridden with the chair harness, wherein the removable bar includes a harness attachment loop disposed on each end of the removable bar to accommodate coupling the chair harness to the removable bar and wherein when the removable bar is removed, the high-speed magnetic trolley can be placed on a zip line cable;
   a plurality of wheels placed between the pair of parallel plates, each wheel includes a fitted track on a middle circumference portion of each wheel that accommodates the zip line cable, the wheels have a rubber coating on the middle circumference portion and the wheels rotate while in contact with the zip line cable;
   one or more spacers that define an open area between the pair of parallel plates where the wheels are placed, the open area between the one or more magnets and the wheels comprises a distance in the range of 1/32 of an inch to 1/4 of an inch to provide more or less braking capability;
   a plurality of body bolts extended through a first set of corresponding apertures, the first set of corresponding apertures disposed on the pair of parallel plates and the body bolts to couple the one or more spacers in place;
   a plurality of axles extended through a second set of apertures disposed on the pair of parallel plates and a centered aperture disposed on each of the wheels, the axles to couple the wheels in place while allowing the wheels to rotate; and a plurality of magnet holder plates coupled to an exterior facing of the pair of parallel plates on an opposite side of the pair of parallel plates adjacent to the wheels, the magnet holder plates coupled with a plurality of fasteners and the magnet holder plates are generally planar shaped and include an aperture to accommodate one or more magnets, wherein the fasteners are a plurality of bolts, the one or more magnets placed inside the high-speed magnetic trolley are in the range of 1 to 20 in order to adjust an amount of braking power and the one or more magnets are coupled in place magnetically by the magnet holder plates.

8. The high-speed magnetic trolley according to claim 7, wherein the pair of parallel plates are made of aluminum.

9. The high-speed magnetic trolley according to claim 7, wherein the removable bar is made of stainless steel.

10. The high-speed magnetic trolley according to claim 7, wherein the wheels are made of aluminum.

11. The high-speed magnetic trolley according to claim 7, wherein each of the wheels has a polyurethane coating on the middle circumference portion.

12. The high-speed magnetic trolley according to claim 7, wherein the one or more spacers are made of aluminum.

13. The high-speed magnetic trolley according to claim 7, wherein the body bolts and the axles are made of stainless steel.

14. The high-speed magnetic trolley according to claim 7, wherein the magnet holder plates are made of steel.

* * * * *